Patented May 8, 1934

1,957,766

UNITED STATES PATENT OFFICE 1,957,766

MANUFACTURE OF ALUMINA HYDRATE

Arthur Fleischer, Hartford, Conn., assignor to Kalunite Company, Philadelphia, Pa., a corporation of Delaware No Drawing. Application June 30, 1933,
Serial No. 678,420

1 Claim. (Cl. 23—143)

My invention relates to the manufacture of alumina hydrate and has for its object to provide a simple and comparatively economical process of producing this material from a basic alum and an alkali metal hydroxide as starting materials by a mode of treatment which will provide for a comparatively easy separation of the alumina hydrate from the alkali metal sulphate by reason of the free filtering character of the alumina hydrate produced by the reaction of the hydroxides upon the basic alum and for a substantially complete recovery of the alumina produced.

In the treatment of a basic alum with solutions of alkali metal hydroxide, I have found that unless special precautions are taken as to the quantity of alkali metal hydroxide present in the solution and also as to the concentration of the solution of alkali metal hydroxide, two drawbacks are liable to occur, the first being that if the hydroxides are present in the solution in quantity appreciably in excess of the combining ratio of the hydroxide with the sulphur trioxide constituent of the basic aluminum sulphate component of the basic alum, there will be produced in part a shiny form of alumina hydrate, the presence of which very seriously interferes with the settling or filtration process used for separating the alumina hydrate from the solution of alkali metal sulphate while, on the other hand, if the solution of alkali metal sulphate used for treating the basic alum is of a concentration in which the hydroxide is present in appreciably more than twenty percent (20%) of the weight of the water, not only will a certain amount of the shiny form of alumina hydrate be produced but it will also be true that at least portions of the basic alum and of the alumina hydrate will be taken into solution. My invention is based upon my discovery that by treating the basic alum with an alkali metal hydroxide solution in which the quantity of alkali metal hydroxide is not materially in excess of the quantity which will react with the sulphur trioxide component of the basic aluminum sulphate constitutent of the basic alum and which solution does not contain alkali metal hydroxide in material excess of twenty percent (20%) of the weight of the water in which it is dissolved, that an alumina hydrate is produced substantially free from the objectionable shiny characteristics and of such a character as to be readily separated from the alkali metal sulphate solution produced in the reaction and that a substantially complete recovery of the alumina as alumina hydrate can be obtained in this way and this treatment constitute my invention.

As an example of my process, I take 130 pounds of filter cake containing 100 pounds of finely divided basic alum and 30 pounds of water. This filter cake is then stirred into a solution made up of 35 pounds of sodium hydroxide and 270 pounds of water. By preference the solution should be of a temperature in excess of 60° C. and preferably, where the reaction occurs without pressure, at a temperature of approximately 100° C., at which last mentioned temperature the reaction will be complete in about two and one-half hours, the alkali metal hydroxide component combining with the sulphur trioxide element of the basic aluminum sulphate constituent of the basic alum, and the alumina hydrate being thereby produced without appreciable shiny components and with practically no taking into solution. I then separate the alumina hydrate from the solution of alkali metal sulphate in any convenient way, that is to say, by settling or filtration or settling and filtration. Both methods of separation can be rapidly and conveniently effected by reason of the absence of the shiny form of alumina hydrate and of the absence of dissolved basic alum or alumina hydrate and where the separation is effected or completed in a vacuum filter I have found it practicable to build up filter cake of about 8 to 12 inches in thickness.

Having now described my invention, what I claim as new and desire to secure by Letters Patent, is:

The method of manufacturing alumina hydrate which consists in treating a finely divided basic alum with a solution of alkali metal hydroxide in which the hydroxide is present in quantity approximately equivalent to the sulphur trioxide constitutent combined with the alumina in the basic alum and not to exceed five percent (5%) excess of said equivalent quantity, said solution having an alkali metal hydroxide component not to exceed twenty percent (20%) by weight of the water in which it is dissolved, thereby producing a free filtering alumina hydrate and a solution of alkali metal sulphate and separating said alumin hydrate from the alkali metal sulphate solution by settling and/or filtration.

ARTHUR FLEISCHER.